March 18, 1969  D. M. WAMPLER ET AL  3,433,616
APPARATUS FOR BENDING GLASS SHEETS
Filed Dec. 3, 1965  Sheet 1 of 3

INVENTORS
David M. Wampler and
Herbert A. Leflet, Jr.

Nobbe & Swope
ATTORNEYS

INVENTORS
David M. Wampler and
Herbert A. Leflet, Jr.

Nobbe & Swope
ATTORNEYS

INVENTORS
David M. Wampler and
Herbert A. Leflet, Jr.

Nobbe & Swope
ATTORNEYS

United States Patent Office 3,433,616
Patented Mar. 18, 1969

3,433,616
APPARATUS FOR BENDING GLASS SHEETS
David M. Wampler and Herbert A. Leflet, Jr., Toledo, Ohio, assignors to Libbey-Owens-Ford Glass Company, Toledo, Ohio, a corporation of Ohio
Filed Dec. 3, 1965, Ser. No. 511,373
U.S. Cl. 65—289                                           2 Claims
Int. Cl. C03b 23/02

ABSTRACT OF THE DISCLOSURE

A gravity mold for bending a glass sheet having a large, flat central area with oppositely disposed flat wing areas projecting at sharp angles from the central area to form a one-piece "bay window." The sectionalized mold includes support members which maintain the large central area of the sheet flat as the wing sections bend.

SPECIFICATION

The present invention relates generally to the bending of glass sheets or plates and more particularly to an improved apparatus for bending large glass sheets.

A recent trend in architectural design and construction of buildings has been to incorporate increasingly more glass in the walls of the structure as a substitute for the various other building materials. For example, a very popular type of building is one in which practically the entire outer wall is formed from large flat sheets or plates of glass mounted in glazing bars secured to the skeleton of the building to provide expansive window areas on each floor.

As a variation in this general design, it now has been proposed to construct a building in which the outer walls are made up of a series of bay windows in place of the flat windows. These bay windows each include a large flat sheet spaced outwardly of the frame of the building and angularly disposed flat sheets extending inwardly from the opposite vertical sides of the first sheet toward the frame of the building. When these windows are arranged substantially side-by-side along the entire outer wall, they provide a more or less sculptured facade whereby the building, as a whole, has a very pleasing appearance. When formed by using ordinary glazing techniques, this bay window structure is somewhat complicated since additional glazing bars are required at each of the intersections of the glass sheets from which the window unit is formed. These glazing bars are very noticeable and tend to detract from the over-all appearance of the building and to interfere with vision through the window.

To eliminate these disadvantages of the bay window structure, the present invention contemplates forming the structure from a single sheet of glass by bending the sheets along axes spaced inwardly of the outer edges of the plate to form a relatively large flat central area with oppositely disposed flat wing areas projecting at a sharp angle from the central section.

The primary object of this invention is to provide a novel apparatus for bending large sheets of glass at sharp angles along straight bend lines.

Another object is to provide an apparatus for producing architectural window units having continuous flat areas angularly disposed relative to each other.

A further object is to provide a mold for bending sheets to the above-described configurations without marring or introducing distortion into the bent sheet.

Other objects and advantages of the invention will become more apparent during the course of the following description when read in connection with the accompanying drawings.

In the drawings, wherein like numerals are employed to designate like parts throughout the same:

Figure 7:
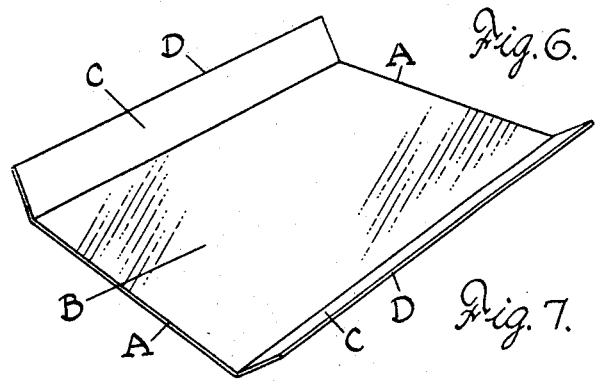
FIG. 7 is a prospective view of a bent glass blank.

Briefly stated, the present invention provides apparatus for bending large glass sheets along spaced longitudinal axes positioned inwardly of the outer edges to produce an architectural glazing structure having spaced relatively sharp bends between a flat central area B and flat wing areas C projecting angularly from the central area at opposite sides thereof (FIG. 7).

Shown in the drawings for purposes of illustration is a bending apparatus 10 embodying the novel features of the present invention for bending large size glass plates or sheets S to the configuration described above. The apparatus 10 includes a sectionalized bending mold 11 and a support rack 12. The support rack 12 is substantially rectangular in shape and comprises spaced longitudinal side members 13 and transversely extending end members 14 connected to one another at opposite ends by triangular shaped plates 15. The lower surfaces of the end members further include a pair of transversely spaced guide rails 16 which may be utilized as a means for guiding the rack through the glass bending furnaces (not shown) commonly used in the bending operation. The rack is straightened by cross-bars 17 which extend between the relatively long side members and are secured thereto in any manner, such as by bolts 18.

To support the mold 11 above the rack 12, an upright support post 19 is provided at each of the corners of the rectangular rack 12. The support posts are secured at the corners by means of a bracket 20 and bolts 21.

The mold 12 is of the general type commonly termed an outline or skeleton mold and comprises a center section 22 and opposite end section 23, disposed end-to-end and mounted on the rack 12 to swing relative to each other between an open and closed position.

The center section 22 comprises spaced rails 24 each having relatively narrow upper surfaces which are finished to form shaping surfaces 25 adapted to receive a glass sheet, when bent, in contact therewith. The spaced rails are rigidly joined together and held in parallel relation by means of rods 26 extending between and rigidly secured to the rails. The end sections 23 are identical in construction and each include spaced side rails 27 interconnected at one end by an end rail 28 extending perpendicular to the side rails with the free ends of the side rails 27 in aligned relation with respective free ends of the rails 24. The upper surfaces of the side and end rails lie in a common plane and are relatively narrow and finished to form a generally flat U-shaped surface 29. Each end section is provided with a rod 30 extending between the side rails and rigidly secured thereto with tie-rods 31 provided between the various rails and rod 30 to further rigidify the end section.

Figure 5:
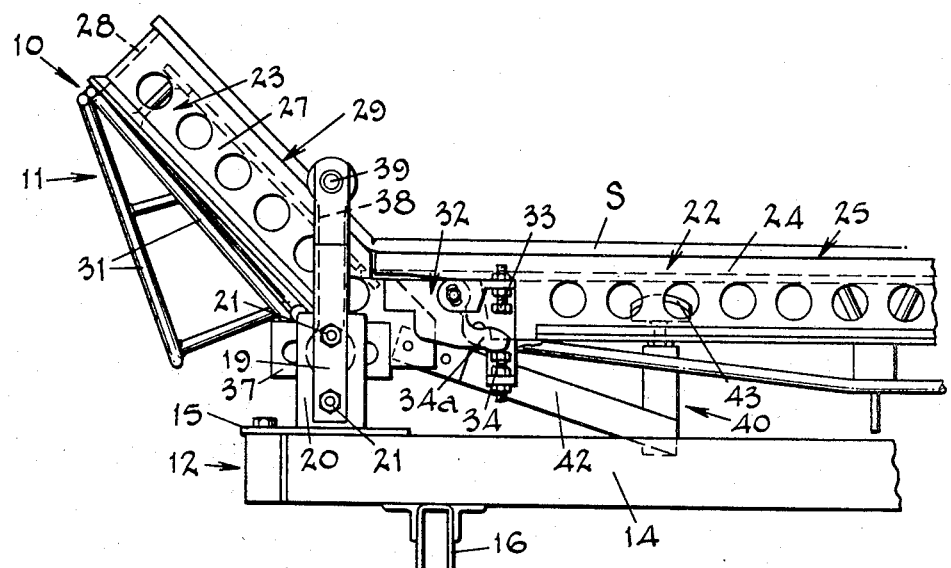
FIG. 5 is an enlarged fragmentary side elevation view showing a portion of the bending apparatus in the closed position.

To movably connect the end sections to the center section, the free ends of the side rails 27 of the end sections and the free ends of the rails 24 of the center section are interconnected by hinges 32 to pivotally join the end sections to the center section. Each hinge is constucted in a manner to provide adjustable stops 33 and 34 limiting the extent of relative movement of the sections to the desired open and closed positions of the mold. Briefly stated, for this purpose each of the hinges 32 includes an arm 34a rigidly connected to the end sections 23 and extending between the stops 33 and 34 associated with the center section 22. The arm 34a engages the limit stop 33 to restrict the relative movement of the mold parts upon movement to the open position (FIG. 6) and engages the stop 34 upon movement of the mold parts to the closed position (FIG. 5). For a more complete description of the details of the hinge construction, reference may be had to Patent No. 3,173,781, issued to David Wampler, Mar. 16, 1965.

Figure 1:
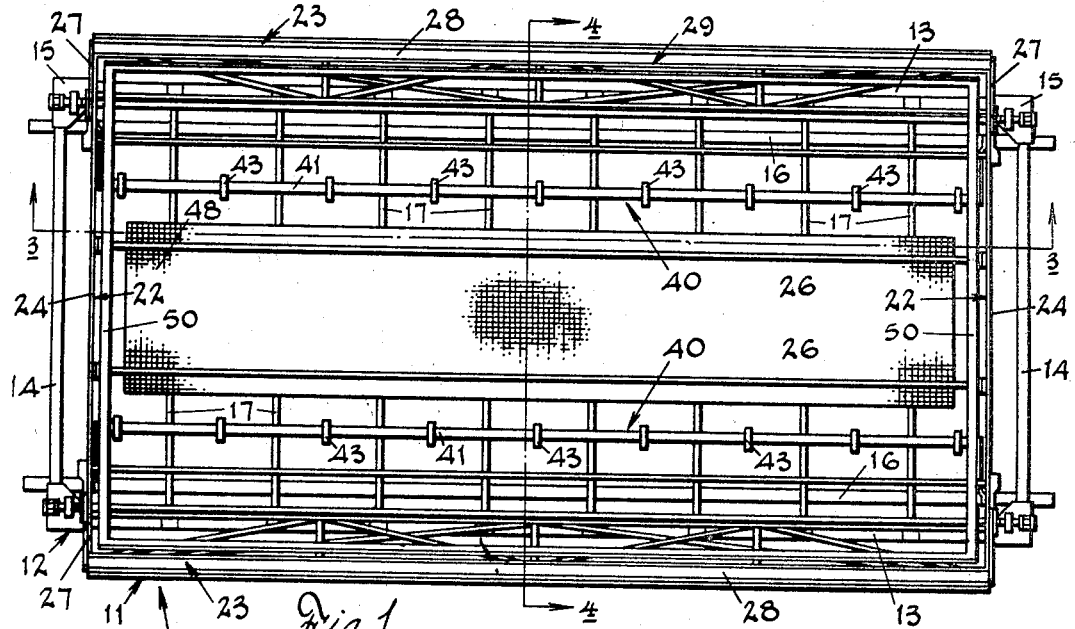
FIG. 1 is a plan view of a bending apparatus incorporating the novel features of the present invention.
Figure 2:
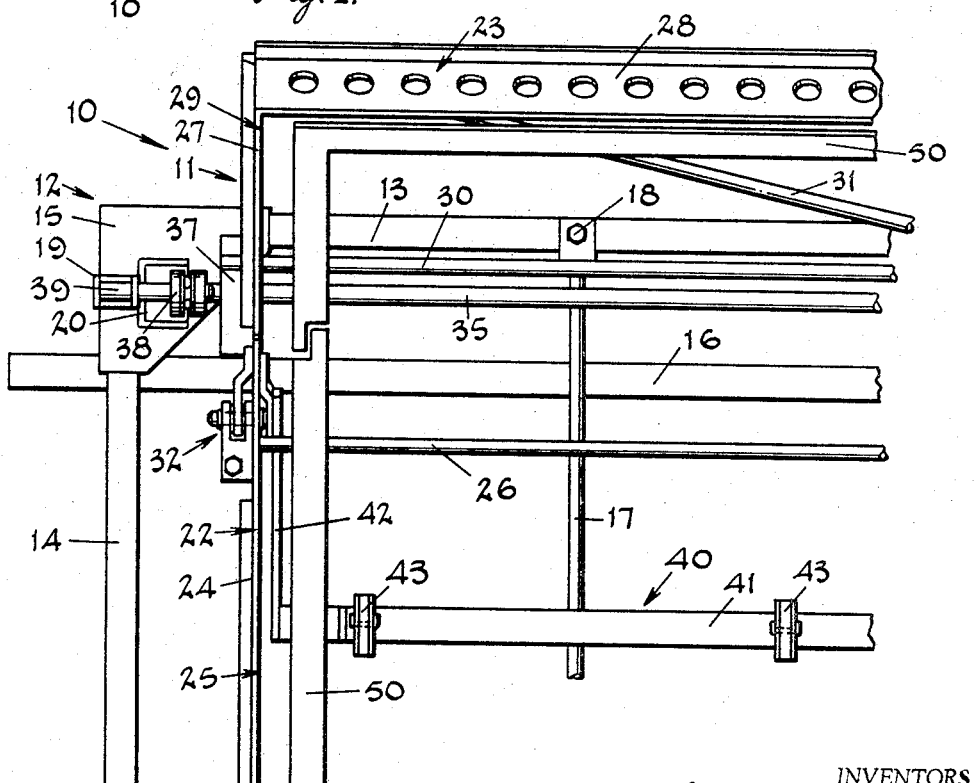
FIG. 2 is an enlarged fragmentary plan view showing one corner of the bending apparatus.
Figure 3:
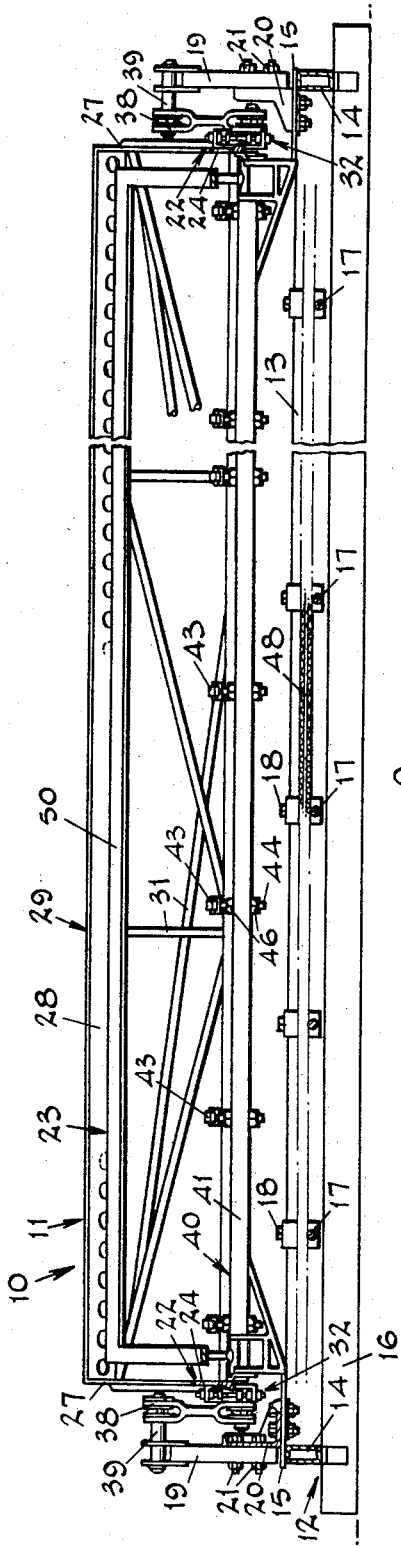
FIG. 3 is a longitudinal sectional view taken along lines 3—3 fo FIG. 1.
Figure 4:
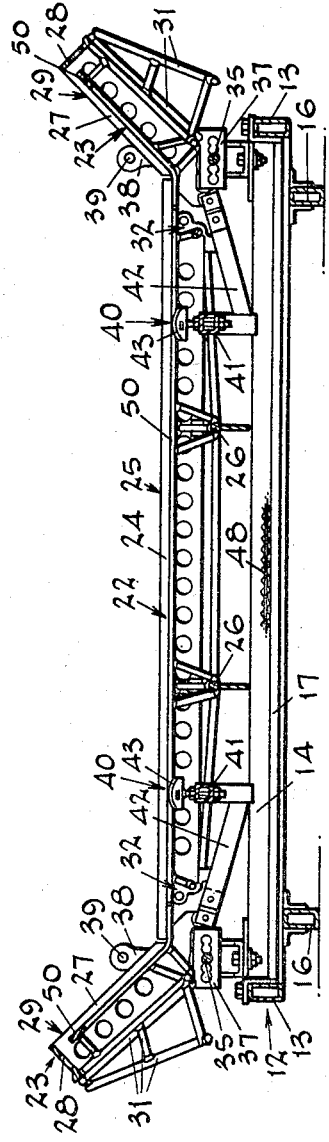
FIG. 4 is a transverse sectional view taken along lines 4—4 of FIG. 1.

As is shown in FIGS. 1, 2 and 4, the upper or shaping surfaces 25 of the rails forming the center section are substantially parallel to each other and define a flat horizontal plane for receiving the marginal edges A of the relatively large central flat portion B of the sheet. Also, the U-shaped shaping surfaces 29 of the end sections lie in a common plane extending in angular relation to the plane formed by shaping surface of the center section. When the mold is in the closed position, as shown in FIG. 5, the surfaces 29 receive the marginal edges D of the wing areas C of the finished unit.

The mold is supported for movement from the open position (FIG. 6) to the closed position (FIG. 5) by means of a transverse rod 35 extending through openings 36 in L-shaped brackets 37 which depend from the side rails 27 of each end section. The opposite ends of the rods 35 extend outwardly beyond the side rails and each are rotatably received in the lower end of a link 38. The upper end of the link is pivotally mounted on a stub shaft 39 extending inwardly from each of the upright support posts 19.

As is well known in the art, the closing speed of the mold depends a large part on the rigidity of the glass sheet as well as the variations in the weight and balance of the different mold sections. In order to provide a ready adjustment for changing the so-called balance of the mold, brackets 37 are provided with a plurality of openings and may be constructed in accordance with the teachings of the above-mentioned patent to thereby provide adjustability in closing speed of the mold.

Figure 6:
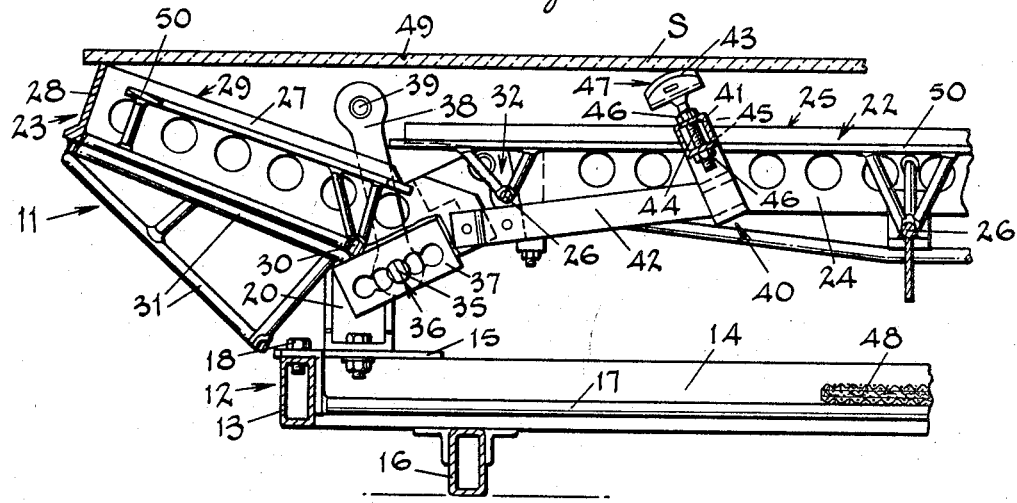
FIG. 6 is a sectional view similar to FIG. 5 showing the bending apparatus in the open position.

As shown in FIG. 6, when a flat sheet of glass to be bent is initially positioned on the bending mold, it is supported by the mold shaping surfaces at its opposite longitudinal edge portions only and the entire central portion of the sheet is unsupported and disposed above the remaining shaping surfaces of the mold. When the sheet is then heated to the softening point of the glass causing it to sag downwardly toward the shaping surfaces, the sheet tends to sag first at the center of mass of the unsupported central portion of the sheet. When this occurs, it is found that kinks or wrinkles are left in the sheet after bending is completed causing optical distortion in the finished unit. In other words, when the sheet bends in the manner described, the centermost portion would not be exactly planar as desired but rather would have small variations in curvature, which variations would result in distortion of objects viewed through the unit. In addition, when one portion such as the center portion B of the sheet sags into registry with the shaping surface while heat is still being applied to the sheet to ensure proper bending of the remaining portions, those portions which first contact the shaping surface tend to sag downwardly below the shaping surface of the mold and thereby to overbend causing a cylindrical or even a spherical curvature in the centermost area of the sheet. This overbending, of course, renders the finished unit unacceptable for its intended purpose.

The foregoing difficulties are particularly troublesome when bending large sheets or plates of glass such as would be the case in the production of glazing units of the type in question. For example, in producing such units, sheets 66 inches wide by 100 inches long by ⅜ inch thick may be used which would result in a large unsupported area of the sheet during the initial phases of the bending operation.

For these reasons, in the production of architectural glazing units of the type shown in FIG. 7, it is highly desirable that the sheet bend initially along the substantially straight bend lines separating the center portion B and the wing portions C and that, to the extent possible, the center section of the sheet be lowered at one time onto the shaping surface of the center mold section. In this way, the centermost portion B and the wing portions C of the sheet are maintained substantially flat throughout the bending operation resulting in the only curvature being along the straight bend lines separating these areas.

To effect this manner of bending, in accordance with the present invention, the bending apparatus is constructed in a novel manner so as to support the innermost portion of the sheet throughout the bending operation and to lower this portion bodily onto the shaping surfaces of the mold. In this way, the only bend in the sheet will be along the substantially straight bend lines. To this end, the innermost portion of the sheet is supported along lines located inwardly of the bend lines and extending parallel to the longitudinal edges of the sheet.

Herein, the means for supporting the centermost sheet areas are mounted for movement from a first position above the shaping surface on the center section of the mold and in the plane of the flat sheet of glass supported on the mold to a second position below this shaping surface as the mold sections move to the closed position thereby to provide the necessary support for the center portions of the sheet throughout the bending of the sheet and closing of the mold. In this manner, the centermost portion of the sheet is deposited on the shaping surface of the center section of the mold at substantially the same time along the entire edges of the sheet.

In the illustrated embodiment, the sheet supporting means 40 comprises a support bar 41 extending parallel to the end rail 28 of the end section and spaced inwardly of the end section. The bar is rigidly secured to the end section by means of a pair of arms 42 extending from opposite ends of the bar 41 with the free ends of the arms secured to the side rails of the end sections as by welding. A plurality of sheet engaging elements or blocks 43 are spaced along the bar and project upwardly therefrom to engage the undersurface of the sheet at spaced points along the support lines. The blocks are mounted on the bar by a threaded member 44 extending through openings 45 in the bar 41 with lock nuts 46 received thereon and engaging opposed surfaces of the bar. This mounting provides a means for individually adjusting the height of the upper surface of each block with respect to the bar to ensure that the sheet will be supported in the proper plane throughout the bending operation.

Preferably, the sheet contacting surfaces of the blocks 43 are formed of a refractory material which will not fuse to the glass during bending of the sheet. Further, to avoid marring the viewing area of the sheets, each of the blocks is provided with a contoured or arcuate upper surface 47 to minimize the contact between the surface of the sheet and the blocks.

In bending a glass blank S on the apparatus of the invention, the mold sections are moved from the normally closed position (FIG. 4) to the open position (FIG. 6). During such movement, the links 38 swing inwardly and the end sections 23 pivot about the transversely extending rod which thereby moves the end rails of the end section downwardly and the center section upwardly to the position shown in FIG. 5, with the limit of movement determined by the position of the stop 33. Also, as the mold is opened, the bars 41 swing into the raised position thereby raising the sheet engaging blocks 43 which are adjusted to lie in the substantially horizontal plane defined by the shaping surfaces of the two end rails of the mold.

The glass blank is then placed upon the mold with the longitudinal edge portions of the sheet supported by the shaping surfaces on the end rails 28 and the intermediate portion of the sheet between the longitudinal edges being supported by the support blocks at spaced points along the entire length of the sheet. The glass sheet, due to its rigidity when cold, will retain the mold sections in the position shown in FIG. 6.

To aid in keeping the central portion of the sheet flat throughout the bending operation, heat-absorbing members 48, such as perforated metallic members, are provided on the rack below the center section of the mold which members absorb heat from the furnace atmosphere and thereby maintain the temperature of the central portion of the sheet below the softening point of the glass. Thus, these members 48 effect a concentration of heat upon the sheets outwardly of the central portion and in the area of the bend.

To reduce distortion adjacent the relatively sharp bend produced in the sheet, the flat sheet is further provided with grooves 49 extending longitudinally thereof along the lines of bend of the sheet. These grooves not only reduce distortion in the finished unit by minimizing the stress imparted to the sheet along the bend line, but also act to establish a line of weakened resistance to ensure that the sheet will sag initially along these lines.

As can be readily appreciated, as the mold passes through the furnace and is subjected to the gradually increasing temperature therein, the areas between the sheet supporting means 40 and the end rail 28 will be heated sufficiently to cause the sheet to begin to sag at these points. This sagging action will redistribute the weight of the glass sheet on the mold sections thereby allowing the mold sections to move from the open position (FIG. 6) toward the closed position (FIG. 5). During this closing action, the end rails of the end sections will pivot about the transversely extending rod and thereby move upwardly, and at the same time the sheet supporting means 40, which are rigidly secured to the end sections, will move downwardly. This will of course further redistribute the weight toward the center section of the mold and thereby complete the closing action.

As can be seen in FIG. 5, when the mold sections come to rest in the closed position as determined by the stop means 34, the blocks 43 of the sheet supporting means 40 will have moved to a position below the shaping surfaces of the center section to deposit the blank upon the shaping surfaces.

As heretofore noted, the bending apparatus constructed in accordance with this invention, is capable of producing finished units, such as the one shown in FIG. 7, having a substantially flat central portion B with wing portions C projecting at a sharp angle from the flat portion. Although the angle of bend between the wings C and the central portion B has, for purposes of illustration, been shown to be approximately 45°, it will be readily apparent that within the spirit of the invention this angle may be varied by merely adjusting the closed stop 34 to change the relative position of the sections when the mold is closed.

As is well known in the art, when a body of glass is heated to its softening point, all internal stress and strain in the glass is relieved. During cooling of the glass from this elevated temperature to a temperature below the annealing range of the glass, internal stresses may be imparted to the body of glass. The character of the stresses developed is dependent upon the rate at which the glass cools. Therefore, by controlling the rate of cooling of different areas of the glass body, regional stresses may be imparted to the cooled sheet, in particular, those portions of the body which cool rapidly set in compression and those portions which cool relatively slower set in tension. Naturally, in the glass body as a whole, at normal temperatures, a condition of stability or equilibrium exists wherein the areas in compression and the areas in tension are in balance.

During the bending process, the bending mold absorbs heat from the furnace and this residual heat counteracts the normal tendency of the glass to uniformly cool and anneal. With the outline type mold described above, the marginal edge portions of the sheet in the immediate vicinity of the shaping surfaces are held at a higher heat for a longer period of time and, therefore, normally have tensile stresses developed therein.

As is also well known, glass is considerably stronger when stressed in compression. Therefore, it is preferred that the outer edges of the finished unit be in compression rendering these edges stronger and better able to withstand mishandling during shipment and/or installation. To this end, a strain bar 50 is mounted on the mold 11 extending completely around the mold and spaced below and inwardly of the shaping surface. The function of the strain bar is to retard cooling in the area of the blank located directly above the strain bar to therefore place this area in tension. The shaping surface of the mold acts in the same manner to also place the contacting portions of the sheet in tension. These two spaced bands of tension are balanced by an intermediate band of compression. As a finishing operation, the blank is then cut to the desired size through this band of compression whereby the outermost edges of the blank or finished unit will be in compression.

Figure 8:
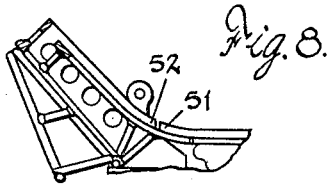
FIG. 8 is a fragmentary end view showing a portion of a modified form of bending mold.

A fragmentary portion of a modified form of mold is shown in FIG. 8, and in most respects, is identical in construction to the mold shown in FIGS. 1 through 6. The modified mold is capable of producing blanks having wing portions similar to the wing portions C extending at an angle to a flat portion B of the sheet. However, when bent on a mold of the modified form, the intersection between the wing portions C and the flat portions B has a small but distinguishable radius of curvature. To this end, the ends of the rails of the center section and end sections are curved, as shown at 51 and 52, to have a smooth continuous upper surface conforming in curvature to the desired radius of bend in the finished unit.

It is to be understood that the forms of the invention herewith shown and described are to be taken as illustrative embodiments only of the same, and that various changes in the shape, size and arrangement of parts may be resorted to without departing from the spirit of the invention.

We claim:

1. Apparatus for bending large sheets of glass to relatively sharp angles along substantially straight bend lines extending parallel to the opposite edges of the sheet thereby to form a bent sheet having a substantially flat central portion and oppositely disposed flat wing portions extending angularly therefrom and joined thereto by relatively sharp bends, said apparatus having, in combination; an articulated, open ring-type bending mold comprising shaping rails arranged to form a central mold section and oppositely disposed end mold sections disposed end-to-end; a rack; means supporting said mold sections on said rack for relative movement between open and closed positions; shaping surfaces formed on said shaping rails conforming in curvature and outline to the bent glass sheets when said sections are in said closed position; sheet support means disposed within the periphery of said shaping rails and having a plurality of support points extending entirely across the mold and spaced apart at short increments, thereby to provide a substantially continuous line of positive support spaced inwardly of and extending parallel to said bend lines and extending throughout the length of the mold; and means mounting said support means on said end sections for movement from an upper sheet supporting position above said shaping surface to a lower inactive position below said shaping surface upon movement of said mold sections from said open to said closed position during bending of the sheet.

2. Apparatus for bending large sheets of glass as defined in claim 1, in which said support means comprises a bar extending across the mold and having a plurality of blocks attached thereto to form said support points.

References Cited

UNITED STATES PATENTS

| | | | |
|---|---|---|---|
| 2,893,170 | 7/1959 | Carson et al. | 65—287 X |
| 3,037,324 | 6/1962 | Carson | 65—290 X |
| 3,325,267 | 6/1967 | Leflet et al. | 65—290 X |

DONALL H. SYLVESTER, *Primary Examiner.*

ARTHUR D. KELLOGG, *Assistant Examiner.*

U.S. Cl. X.R.

65—288, 291